United States Patent [19]

Roth

[11] 3,769,082
[45] Oct. 30, 1973

[54] PROCESS FOR COATING A SUBSTRATE WITH A SULFONAMIDE-SUBSTITUTED TRIAZINE INTUMESCENT AGENT

[75] Inventor: Shirley H. Roth, Highland Park, N.J.

[73] Assignee: Cities Service Company, New York, N.Y.

[22] Filed: Jan. 21, 1972

[21] Appl. No.: 219,878

[52] U.S. Cl............ 117/136, 106/15 FP, 252/8.1, 117/138.8 B, 117/147
[51] Int. Cl................................................ C09d 5/18
[58] Field of Search.................. 260/246.6, 246.5, 260/239.7, 397.8; 117/136, 138.8 B, 147; 252/8.1; 106/15 FP

[56] References Cited
UNITED STATES PATENTS

| 2,312,698 | 3/1943 | D'Alelio | 260/239.7 |
| 2,616,866 | 11/1952 | Juda | 117/136 X |
| 2,648,641 | 8/1953 | Robison | 117/136 X |
| 2,872,355 | 2/1959 | Muller et al. | 117/136 |
| 2,984,640 | 5/1961 | Kaplan | 117/136 X |
| 3,635,970 | 1/1972 | Fessler et al. | 260/249.6 |

Primary Examiner—William D. Martin
Assistant Examiner—Theodore G. Davis
Attorney—Richard S. Strickler, Elton F. Gunn, Burton E. Levin, Joshua J. Ward, Edwin T. Yates, George L. Rushton, A. Joe Reinert and Patricia J. Hogan

[57] ABSTRACT

Intumescent compositions of the invention comprise sulfonamidoarylamino-substituted 1,3,5-triazines, such as 2-(p-sulfonamidoanilino)-4,6-diamino-1,3,5-triazine, 2,4-bis(p-sulfonamidoanilino-6-amino-1,3,5-triazine, and 2,4,6-tris(p-sulfonamidoanilino)-1,3,5-triazine. The intumescent agents are employed in a process for protecting a substrate from heat and fire. The intumescent agents may be employed in conjunction with conventional additives.

5 Claims, No Drawings

PROCESS FOR COATING A SUBSTRATE WITH A SULFONAMIDE-SUBSTITUTED TRIAZINE INTUMESCENT AGENT

BACKGROUND OF THE INVENTION

1. Field of the Invention

This invention relates to intumescent compositions and more particularly relates to such compositions containing a one-component intumescent agent.

2. Description of the Prior Art

It is known that a substrate may be protected from heat and fire by the application of an intumescent composition. Intumescent compositions of the prior art usually contain an intumescent agent having at least three components, i.e., a carbonific, a spumific, and a catalyst; and they are typically characterized by the disadvantages of high cost, low spreading rate, relatively poor efficiency, poor water resistance, and poor weatherability.

As disclosed in U. S. Pat. No. 3,535,130, it has already been discovered that a one-component intumescent agent has advantages over multicomponent intumescent agents. However, the intumescent agents of the patent have poor adherence to substrates and have an undesirable degree of moisture sensitivity.

SUMMARY OF THE INVENTION

An object of this invention is to provide a novel class of one-component intumescent agents.

Another object is to provide such intumescent agents having good efficiency and a low level of moisture sensitivity.

These and other objects are attained by using as intumescent agents compounds corresponding to the formula:

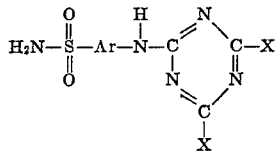

wherein Ar is a divalent aromatic residue and X is amino, hydroxy, halo, or

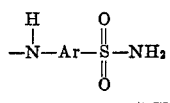

DESCRIPTION OF THE PREFERRED EMBODIMENTS

The intumescent agents of the invention may be any compounds corresponding to the above formula. However, they are preferably compounds wherein Ar is a divalent aromatic residue derived from benzene or naphthalene or a haloalkyl, haloalkoxy, halo, hydroxy, carboxy, amino, amido, or nitro derivative thereof. When the aromatic ring bears organic substituents, it is usually preferred that these substituents contain one at five carbon atoms. When there are halo substituents on the aromatic or triazine ring, it is usually preferred that they be chloro or bromo. It is also preferred that the aromatic ring have at least one free reactive position.

Exemplary of the intumescent agents of the invention are 2-(p-sulfonamidoanilino)-4,6-diamino-1,3,5 triazine, 2-(3-chloro-4-sulfonamidoanilino)-4,6-diamino-1,3,5-triazine, 2-(4-bromo-2-sulfonamidoanilino)-4,6-diamino-1,3,5-triazine, 2-(4-trichloromethyl-3-sulfonamidoanilino)-4,6-diamino-1,3,5-triazine, 2-(3-chloromethoxy-4-sulfonamidianilino)-4,6-diamino-1,3,5-triazine, 2-(3-carboxy-4-sulfonamidoanilino)-4,6-diamino-1,3,5-triazine, 2-(3-amino-4-sulfonamidoanilino)-4,6-diamino-1,3,5-triazine, 2-(2-acetamido-4-sulfonamidoanilino)-4,6-diamino-1,3,5-triazine, 2-(4-nitro-2-sulfonamidoanilino)-4,6-diamino-1,3,5-triazine, 2-(p-sulfonamidoanilino)-4,6-dihydroxy-1,3,5-triazine, 2-(p-sulfonamidoanilino)-4,6-dichloro-1,3,5-triazine, 2-(p-sulfonamidoanilino)-4,6-dibromo-1,3,5-triazine, 2,4-bis(p-sulfonamidoanilino)-6-amino-1,3,5-triazine, 2,4,6-tris(p-sulfonamidoanilino)-1,3,5-triazine, the corresponding sulfonamidonaphthaleneamino compounds, etc. The preferred intumescent agents include 2-(p-sulfonamidoanilino)-4,6-diamino-1,3,5-triazine, 2,4-bis(p-sulfonamidoanilino)-6-amino-1,3,5-triazine, and 2,4,6-tris(p-sulfonamidoanilino)-1,3,5-triazine. When not readily available, these compounds may be preapared by known techniques.

For use in protecting a substrate from heat and fire, the intumescent agents of the invention may be applied in any suitable manner, e.g., electrodeposition, spraying of powdered intumescent agent onto an adhesive substrate, etc. However, it is usually preferred to compound the intumescent agent with a binder, e.g., nitrocellulose, and optionally also with one or more of the other ingredients conventionally used in intumescent compositions, e.g., stabilizers, dispersing agents, pigments, driers, biocides, anti-foamers, thickeners, protective colloids, fillers, blowing agents, etc.; disperse the composition in a suitable liquid medium e.g., water or a solvent or solvent mixture; and apply the coating composition thus formed to the substrate to be protected. As is the case with conventional intumescent coating compositions, it is frequently convenient to apply these coating compositions in the form of a paint having a solids content of about 10–70 percent by weight and an intumescent agent/binder weight ratio of about 0.075–14/1 to deposit a coating having a dry thickness of about 0.001–0.75 inch.

The intumescent agents of the invention are efficient, have low moisture sensitivity, and intumesce without flaming to form foams having good volume, cell structure, and adherence to substrates, such as wood, metal, and plastics. They are also useful as flame retardants in normally flammable compositions.

The following examples are given to illustrate the invention and are not intended as a limitation thereof.

EXAMPLE I

Place 1 gram of 2-(p-sulfonamidoanilino)-4,6-diamino-1,3,5-triazine in an aluminum pan and flame it with a propane torch. The compound intumesces without melting or flaming to form an excellent volume of foamed char having good structure and resiliency.

EXAMPLE II

Repeat Example I except for substituting 2,4-bis(p-sulfonamidoanilino)-6-amino-1,3,5-triazine, 2,4,6-tris(p-sulfonamidoanilino)-1,3,5-triazine, and 2-(p-sulfonamidoanilino)-4,6-dichloro-1,3,5-triazine, respectively, for the 2-(p-sulfonamidoanilino)-4,6-diamino-1,3,5-triazine. Similar results are observed.

Similar results are also observed when the other intumescent agents mentioned in the specification are substituted for the intumescent agents of the examples.

It is obvious that many variations may be made in the products and processes set forth above without departing from the spirit and scope of this invention.

What is claimed is:

1. A process for protecting a substrate from heat and fire which comprises applying thereto an intumescent composition comprising as the intumescent agent a compound corresponding to the formula:

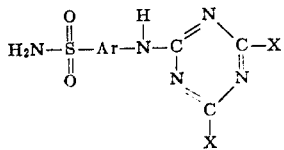

wherein Ar is a divalent aromatic residue and X is amino, hydroxy, halo, or

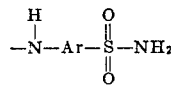

2. The process of claim 1 wherein Ar is a divalent aromatic residue derived from benzene.

3. The process of claim 2 wherein the intumescent agent is 2-(p-sulfonamidoanilino)-4,6-diamino-1,3,5-triazine.

4. The process of claim 2 wherein the intumescent agent is 2,4-bis(p-sulfonamidoanilino)-6-amino-1,3,5-triazine.

5. The process of claim 2 wherein the intumescent agent is 2,4,6-tris(p-sulfonamidoanilino)-1,3,5-triazine.

* * * * *